United States Patent [19]
Tepper

[11] 3,794,144
[45] Feb. 26, 1974

[54] MOTOR VEHICLE ANTI-SKID DEVICE

[75] Inventor: Joel Tepper, Montreal, Quebec, Canada

[73] Assignee: The Raymond Lee Organization, Inc., New York, N.Y.

[22] Filed: Oct. 16, 1972

[21] Appl. No.: 289,826

[52] U.S. Cl. .................................. 188/4 R, 180/7 R
[51] Int. Cl. ............................................. B60t 1/14
[58] Field of Search ...................... 180/7 R; 188/4 R

[56] References Cited
UNITED STATES PATENTS

| | | | |
|---|---|---|---|
| 1,179,691 | 4/1916 | Zerk | 188/4 R |
| 2,097,329 | 10/1937 | Karl | 188/4 R |
| 3,612,200 | 10/1971 | Cailyer | 188/4 R X |
| 3,078,963 | 2/1963 | Shea | 188/4 R |
| 1,007,268 | 10/1911 | Clark | 188/4 R |
| 1,600,111 | 9/1926 | Haegle | 188/4 R |

FOREIGN PATENTS OR APPLICATIONS

| 411,175 | 6/1934 | Great Britain | 188/4 R |
|---|---|---|---|

Primary Examiner—Duane A. Reger
Attorney, Agent, or Firm—Daniel Jay Tick

[57] ABSTRACT

An anti-skid device for motor vehicles provides, particularly at start-up on slippery roads, additional friction to the traction wheels of the vehicle. The anti-skid comprises a traction shoe disposed in facing relation with the tread of the wheel tire and normally out of contact with it. The shoe is mounted at one end of an arm of which the other end is mounted to extend radially from the wheel axle and to be rotatable therearound. A releasable locking device on the arm locks the shoe in inoperative position outwardly away from the tread and stationary with respect to the frame and presses the shoe against the tread in operative position and upon being released. The shoe is thus inserted between the tread and the ground to provide the wheel with anti-skid friction upon starting of the vehicle on slippery grounds.

9 Claims, 14 Drawing Figures

PATENTED FEB 26 1974 3,794,144

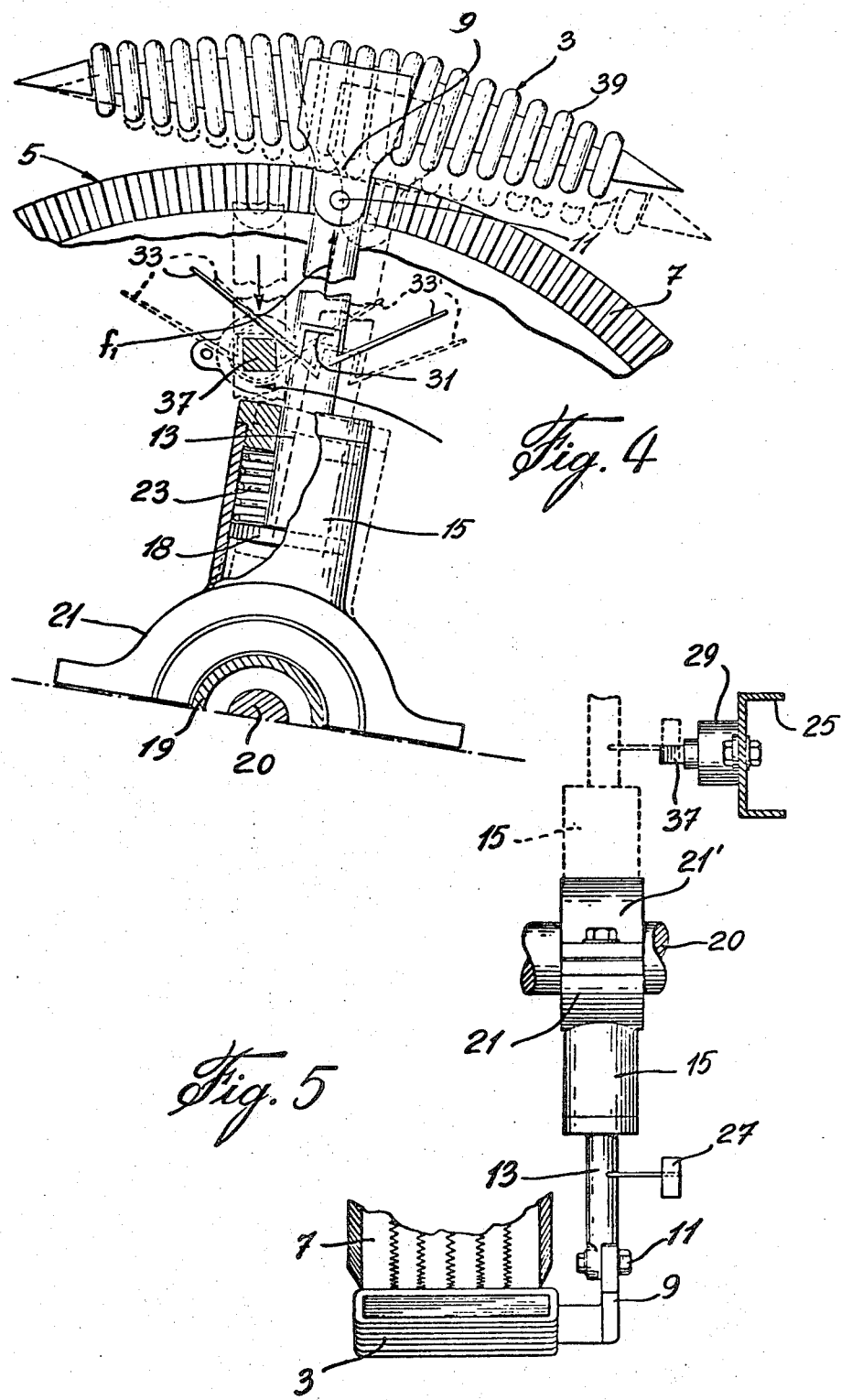

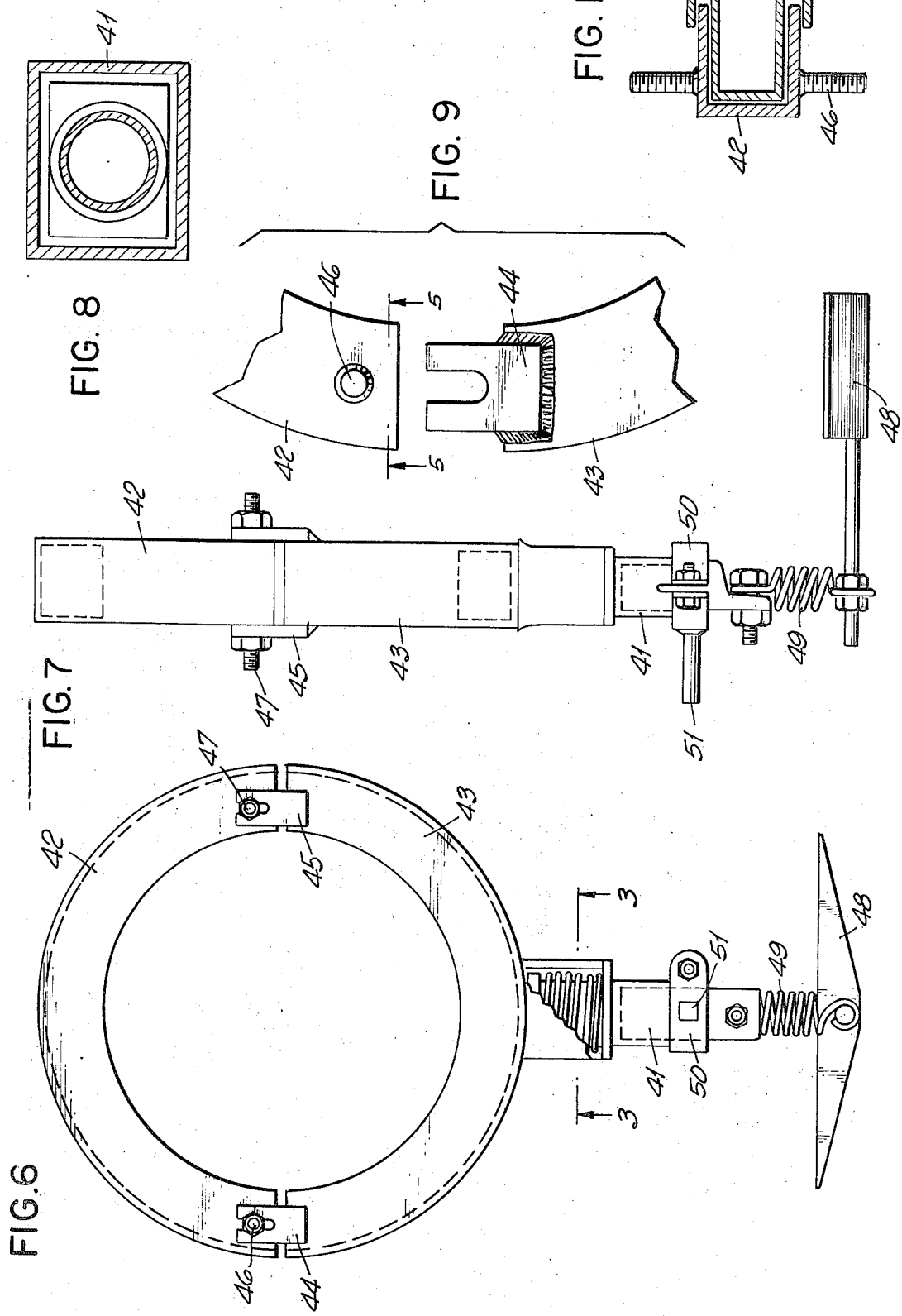

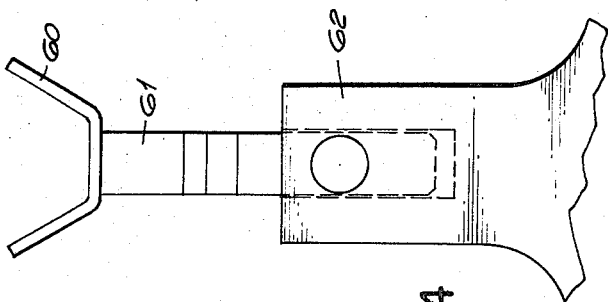
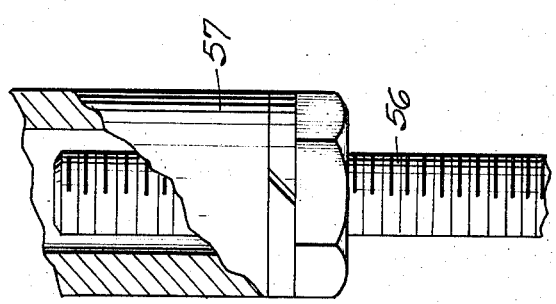
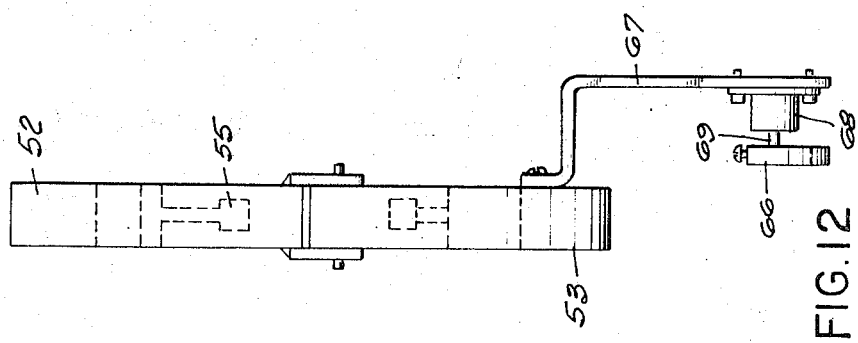
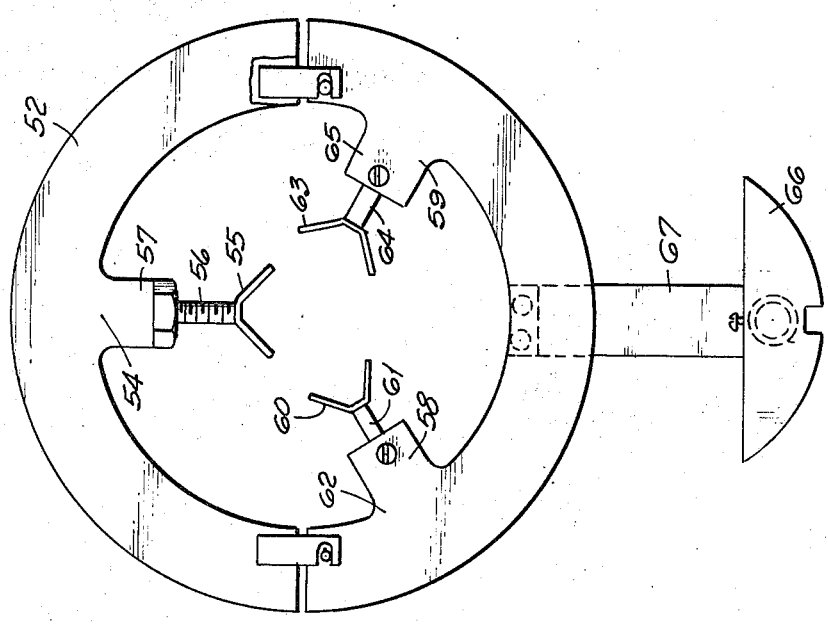

MOTOR VEHICLE ANTI-SKID DEVICE

DESCRIPTION OF THE INVENTION

The present invention relates to an anti-skid device for motor vehicles. More particularly, the invention relates to an anti-skid device to provide traction wheels of a motor vehicle with additional friction upon start up, particularly on a slippery road.

An object of the invention is to cause insertion, between the slippery road surface and the tread of the tire of the traction wheel, of a traction shoe having a rough or corrugated surface so that the wheel does not idly spin on the road when the vehicle is started.

Devices to cause actuation of such traction shoes are already known, but they are complicated in structure and thus costly and difficult to adapt to existing vehicles. These disadvantages may be substantially reduced with the anti-skid device of the present invention, which comprises a stretchable arm mounted at one end to extend radially, and to be rotatable about, the axis of the wheel axle, the shoe being mounted at the other end of the arm. Releasable locking means are provided on the arm and on the frame of the vehicle to lock the shoe in inoperative position outwardly away from the tread and stationary with respect to the frame, and to press the shoe against the tread in operative position and upon being released, whereby to allow the shoe to become inserted between the tread and the ground to provide the wheel with anti-skid friction upon starting of the vehicle.

Preferably, the releasable locking means comprises a notched element on the arm and solenoid means on the frame, the solenoid means including a pin insertible in the notch of the element, in inoperative position, to lock the arm against rotation and in stretched condition wherein the shoe is free from the tread. In operative position, the solenoid means causes retraction of the pin from the notch to allow the arm to contract and the shoe to thus become applied against the tread and thus rotate with the wheel.

The stretchable arm may be advantageously formed of two telescopic members, one holding the shoe and being resiliently biassed toward the other member. In order to allow easy insertion of the notched element over the pin, at least one guiding ramp is disposed upstream of the notch with respect to the direction of rotation of the arm, the ramp being disposed to contact the pin to force the arm to stretch while the pin moves on the ramp and to guide the latter into the notch. The position of the notch on the arm is such as to hold the shoe free of the tread when the pin is inserted therein.

In order that the invention may be readily carried into effect, it will now be described with reference to the accompanying drawings, wherein:

FIG. 4 is another side view of the embodiment of FIG. 1, on an enlarged scale, in greater detail;

FIG. 5 is a front view of the embodiment of FIG. 1 with the shoe about to be inserted between the tire and the road;

FIG. 6 is a side view of another embodiment of the anti-skid device of the invention;

FIG. 7 is a front view of the embodiment of FIG. 6;

FIG. 8 is a sectional view, taken along the lines 8—8, of FIG. 6;

FIG. 9 is an exploded view, on an enlarged scale, of part of the anti-skid device of FIG. 6;

FIG. 10 is a sectional view, taken along the lines 10—10, of FIG. 9;

FIG. 11 is a side view of still another embodiment of the anti-skid device of the invention;

FIG. 12 is a front view of the embodiment of FIG. 11;

FIG. 13 is a view, on an enlarged scale, of part of the anti-skid device of FIG. 11; and FIG. 14 is a view, on an enlarged scale, of part of the anti-skid device of FIG. 11.

Figures 1, 2, 3:
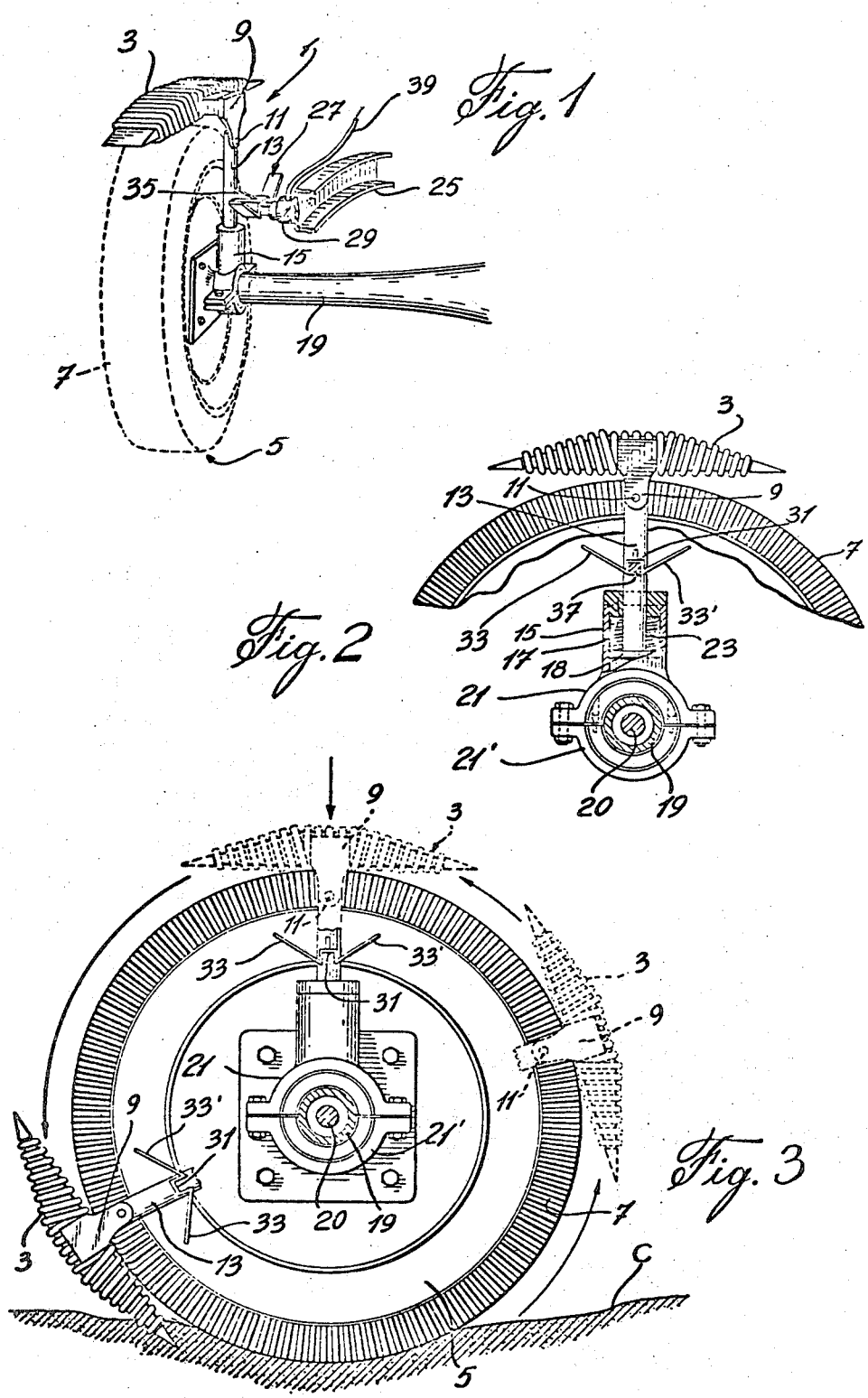
FIG. 1 is a perspective view of an embodiment of the anti-skid device of the invention mounted on a traction wheel assembly.
FIG. 2 is a side view of the embodiment of FIG. 1.
FIG. 3 is a side view of the embodiment of FIG. 1, on an enlarged scale, with the traction shoe shown in various positions around the wheel.

In FIGS. 1 to 5, the anti-skid device 1 of the invention comprises a traction shoe 3 disposed outwardly of a traction wheel 5 in facing relation with a wheel tire tread 7. The shoe 3 is centrally affixed on a support 9 extending on the inward side only of the wheel 5 and pivotally mounted, as at a point 11, at the upper end of a stretchable arm.

The stretchable arm comprises a rod 13 telescopically received in a cylinder 15 and having a piston 18 at the end inside said cylinder. The cylinder 15 is closed at one end by a cap 17 and is mounted at the other end on a housing 19 of a wheel axle 20 by means of a pair of known half-circular collars 21, 21', clamped together by nuts. The arm 13, 15 thus extends radially with respect to the wheel axis, and since the collars 21 and 21' are loosely mounted over the axle housing 19, the arm can rotate around the wheel axle, when free.

A spring 23, inside the cylinder 15 and between the cap 17 and the piston 18, biasses the shoe 3 toward the tread 7 of the wheel tire 5.

As hereinbefore mentioned, the invention provides for releasable locking means on the arm, more specifically on the arm rod 13 and on a frame 25 (FIG. 1) of the vehicle to lock the shoe 3 in inoperative position (FIGS. 1 and 2) outwardly away from the tire tread 7 and stationary with respect to said frame. The releasable locking means also press, through a spring 23, the shoe 3 against the tread 7 in operative position (FIG. 3) and upon being released, thereby permitting the shoe 3 to become inserted between the tread and the ground, as clearly shown in FIG. 3. In this manner, because of the anti-skid nature of the shoe surfaces, anti-skid friction is applied to the wheel, which is extremely useful when starting up on slippery grounds.

The releasable locking means shown in the preferred illustrated example comprises a notched element 27 secured to the arm rod 13 and a solenoid 29, cooperating therewith and fixed to the frame 25. The notched element 27 has a central part defining a square notch 31 open at the bottom. From two opposite sides of the open end of the notch 31, extend ramp-like wings 33 and 33' for a purpose to be defined hereinafter. The element 27 is secured to the rod 13 in any known manner such as, for example, by means of a small triangular bracket 35 (FIG. 1).

The solenoid unit 29 is of the conventional type, including an inner core in the form of a square pin 37. It is connected to a normally open electrical power circuit (not shown in the FIGS.) through wire connections 39 and is operable by the operator of the vehicle. When the operator closes the electrical circuit, through an operating switch, the pin 37 is drawn inside the coil, against a spring bias, and is withdrawn from the notch 31, as will be readily apparent to those skilled in the art. When the operator releases the switch, the circuit is de-energized and the pin moves out of the solenoid under the action of its spring bias.

The position of the core pin 37 is such, as clearly shown in FIG. 2, that in the inoperative position of the device, with the pin 37 in the notch 31, the stretchable arm 13, 15 is in stretched condition with the shoe 3 out of contact with the wheel tread 7.

The operation of the device is as follows, reference being had to FIGS. 1 and 4, particularly.

When the operator of the vehicle presses on the switch to energize the solenoid 29, the pin 37 moves inside the electromagnet and out of the notch 31, freeing the rod 13 which then telescopes further inside the cylinder 15 under the action of the spring 23. The shoe 3 is then pressed against the tire tread 7 (FIG. 3) and moves with the wheel 5. As the shoe 3 is inserted between the tread 7 and the ground, the wheel stops spinning and moves forward. After the shoe 3 is released from between the tread and the ground, it keeps on rotating until it hits the guiding ramp 33 of the notched element 27 thereby causing stretching of the arm 13, 15 in the sense indicated by the arrow $f_1$ of FIG. 4, prior to its insertion into the groove 31 when it, again, locks the device in inoperative position with the shoe 3 away from the tread 7.

Obviously, the spring 23 must be sufficiently soft to allow easy stretching of the arm under the momentum applied to it by the wheel, since the arm loses its rotational power as soon as the shoe moves away from the tread and can thus only count on the momentum applied thereto to cause the pin 37 to ride up the ramp 33 and into the groove 31.

The shoe 3 may have an adequate gripping action by being provided with a wedge shape in either direction longitudinally and from its pivot axis 11, and having a wire 39 coiled therearound, as illustrated in FIG. 4.

In the embodiment of FIGS. 6 to 10, an axle mounting device adjustably mounts the arm 41 at the one end thereof on the axle of the wheel (not shown in the FIGS.). The axle mounting device of FIGS. 6 to 10 comprises a pair of semi-annular members 42 and 43 (FIGS. 6, 7, 9 and 10) adjustably affixed to each other via slotted plates 44 and 45 and corresponding bolts 46 and 47 (FIGS. 6 and 7).

The semi-annular members 42 and 43 are affixed to each other around the axle to form a substantially annular member. The arm 41 is affixed at the one end thereof to the semi-annular member 43.

In the embodiment of FIGS. 6 to 10, the shoe 48 (FIGS. 6 and 7) is mounted on the arm 41 via a shock absorber 49. The solenoid 50 and its pin 51 are mounted on the arm 41 (FIGS. 6 and 7).

In the embodiment of FIGS. 11 to 14, a mounting device comprises a pair of semi-annular members 52 and 53 (FIGS. 11 and 12) affixed to each other around the axle of the wheel (not shown in FIGS. 11 to 14) to form a substantially annular member. The semi-annular member 52 has a radially extending part 54 directed inwardly therefrom. The part 54 has a clamp 55 (FIG. 11) adjustably affixed thereto in radial direction for clamping the axle. The clamp 55 may thus be affixed to an externally threaded member 56 which is threadedly coupled to an internally threaded projection 57 (FIGS. 11 and 13).

The semi-annular member 53 has two radially extending parts 58 and 59 directed inwardly therefrom. The part 58 has a clamp 60 (FIGS. 11 and 14) adjustably affixed thereto in radial direction for clamping the axle. The clamp 60 may be affixed to an externally threaded member 61 which is threadedly coupled to an internally threaded projection 62 (FIGS. 11 and 14).

The part 59 has a clamp 63 (FIG. 11) adjustably affixed thereto in radial direction for clamping the axle. The clamp 63 may be affixed to an externally threaded member 64 which is threadedly coupled to an internally threaded projection 65 (FIG. 11).

The traction shoe 66 (FIGS. 11 and 12) is disposed outwardly of the wheel (not shown in FIGS. 11 to 14) in facing relation with the tread of said wheel. A bracket 67 (FIGS. 11 and 12) is affixed at one end thereof to the semi-annular member 53.

The shoe 66 is mounted at the other end of the bracket 67 in a manner whereby in one position the shoe is maintained stationary and spaced from the tread of the wheel and in another position the shoe is applied against the tread and thus rotates with the wheel. The shoe 66 is mounted on the bracket 67 via a solenoid 68 mounted on said bracket (FIG. 12) and including a pin 69 movable by said solenoid and affixed to said shoe.

I claim:

1. An anti-skid device for use with a traction wheel of a motor vehicle having a frame, said wheel being mounted on an azle and having a tire with a circumferential tread, said device comprising a traction shoe disposed outwardly of the wheel in facing relation with the circumferential tread;

a stretchable arm mounted at one end to extend radially from, and to be rotatable about, the axis of the axle;

means mounting the shoe at the other end of the arm, the shoe being mounted at the other end of the arm for pivotal action about an axis parallel to the axis of the axle and having a wedge shape in either direction longitudinally and from its pivot axis and having a wire coiled therearound to provide anti-skid surfaces; and releasable locking means on the arm and on the frame to lock the shoe in inoperative position outwardly away from the tread and stationary with respect to the frame, and to press the shoe against the tread in operative position and upon being released, whereby to allow the shoe to become inserted between the tread and the ground to provide the wheel with anti-skid friction upon starting of the vehicle on slippery grounds, the releasable locking means comprising a notched element on the arm and solenoid means on the frame, the solenoid means including a pin insertible in the notch of the element, in the inoperative position, to lock the arm against rotation and in stretched condition wherein the shoe is free from the tread, the solenoid means, in the operative position, causing retraction of the pin from the notch to allow the arm to contract and the shoe to become applied against the tread and thus rotate with the wheel.

2. A device as claimed in claim 1, wherein the stretchable arm comprises two telescopic members, one of the members holding the shoe and being resiliently biassed toward the other member.

3. A device as claimed in claim 1, further comprising axle mounting means for adjustably mounting the arm at the one end thereof on the axle, said axle mounting means comprising a pair of semi-annular members adjustably affixed to each other around the axle to form a substantially annular member, the arm being affixed at the one end thereof to one of the semi-annular members.

4. A device as claimed in claim 1, further comprising axle mounting means for adjustably mounting the arm at the one end thereof on the axle, said axle mounting means comprising a pair of semi-annular members affixed to each other around the axle to form a substantially annular member and having radially extending parts directed inwardly therefrom, each of the parts having a clamp adjustably affixed thereto in radial direction for clamping the axle, the arm being affixed at the one end thereof to one of the semi-annular members.

5. A device as claimed in claim 1, wherein the notched element has at least one guiding ramp upstream of the notch with respect to the direction of rotation of the arm, the ramp being disposed to contact the pin of the solenoid means to force the arm to stretch while the pin moves on the ramp and to guide the pin in the notch, the position of the notch on the arm being such as to hold the shoe free of the tread when the pin is inserted therein.

6. A device as claimed in claim 3, wherein the means mounting the shoe on the arm comprises a shock absorber.

7. An anti-skid device for use with a traction wheel of a motor vehicle having a frame, said wheel being mounted on an axle and having a tire with a circumferential tread, said device comprising mounting means comprising a pair of semi-annular members affixed to each other around the axle to form a substantially annular member and having radially extending parts directed inwardly therefrom, each of the parts having a clamp adjustably affixed thereto in radial direction for clamping the axle;

a traction shoe disposed outwardly of said wheel in facing relation with the circumferential tread;

bracket means affixed at one end thereof to one of the semi-annular members; and means mounting the shoe at the other end of the bracket means in a manner whereby in one position the shoe is maintained stationary and spaced from the tread and in another position the shoe is applied against the tread and thus rotates with the wheel, the mounting means comprising solenoid means mounted on the bracket means and including a pin movable by the solenoid and affixed to the shoe.

8. A device for temporarily providing additional traction to a driving wheel of a motor vehicle, comprising a traction shoe;

a stretchable arm at one end of which the traction shoe is pivotally mounted, the arm being secured at its other end to a wheel axle, the stretchable arm comprising two parts mounted in slidable engagement and provided with resilient means, the stretchable arm being locked in extended inoperative position by the pin, the end of the stretchable arm which is secured to the wheel axle having the form of a hollow cylinder which contains the resilient means and which engages said other part of the stretchable arm, the other part comprising a rod which is surrounded by the resilient means;

a notched element secured at right angles to the rod of the stretchable arm and having inclined ramp surfaces;

a pin adapted to fit the notch of the element; and a solenoid to move the pin in and out of the notch.

9. A device as claimed in claim 8, wherein the traction shoe has threaded surfaces.

* * * * *